F. SCHWARZER.
COMBINATION AIR VALVE AND PRIMING CUP.
APPLICATION FILED APR. 9, 1920.

1,383,244. Patented June 28, 1921.

Inventor:
Fritz Schwarzer.
by Paul T. Schilling
Atty.

UNITED STATES PATENT OFFICE.

FRITZ SCHWARZER, OF ST. GALLEN, SWITZERLAND.

COMBINATION AIR-VALVE AND PRIMING-CUP.

1,383,244. Specification of Letters Patent. Patented June 28, 1921.

Application filed April 9, 1920. Serial No. 372,700.

*To all whom it may concern:*

Be it known that I, FRITZ SCHWARZER, a citizen of the Swiss Confederation, and residing at St. Gallen, Switzerland, have invented certain new and useful Improvements in Combination Air-Valves and Priming-Cups, of which the following is a specification.

My invention relates to an improved combination air valve and priming cup for internal combustion engines, and has for its object the provision of a cheap, easily constructed and repaired, reliable device which will do away with certain defects found in prior devices of this type, chief among which defects is the tendency to leak and to be left open accidentally, the danger of sticking under the high heat to which the valve is exposed, and the liability of clogging up from carbon and dirt accumulation which requires frequent taking apart for cleaning purposes.

Figure 1:
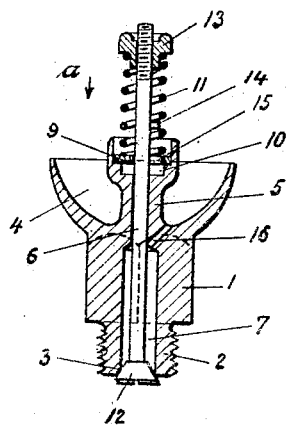
Figure 2:
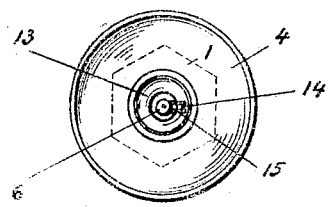

The combination device forming the object of the present invention effectively obviates these disadvantages, and it will now be fully described in connection with the accompanying drawing, in which Figure 1 represents an axial section through the valve, and Fig. 2 a plan view thereof.

The valve casing body proper 1, of polygonal, preferably hexagonal, cross-section, is provided below with an outwardly threaded neck portion 3 presenting at its lower end the valve seat 2, and above with the cup member 4 and a centrically arranged, axially bored guide member 5, through which passes the valve spindle 6. A central bore 7 extending from the valve seat 2 up through the neck 3 and part of the body 1 communicates with the cup interior by means of a duct 16. The upper widened end of the guide member 5 is centrically recessed to present an annular depression or chamber 10 and a larger superposed socket portion, the latter designed to fixedly receive a supporting annulus or washer 9 and reposing on the latter the lower end of a compression spring 11 whose upper end is acted on by the adjusting nut 13, which threads on the upper end of the valve spindle 16 and whose outer circumference is preferably knurled to afford a better purchase to the fingers. The washer 9, which may be fixed in position within the socket in any suitable manner, for instance by jamming or swaging, or by circumferentially compressing the socket, is provided with a cut-out 15 open toward the spindle, and the latter carries at its lower end the frusto-conical valve body 12. By manipulating the nut 13 relative to the spindle the operation of the valve spindle may be controlled.

A pin 14, laterally extending from the valve spindle is designed to readily pass through the cut-out 15 in the washer 9 and to lock the spindle in its lowermost position, that is to say in the position in which the valve body is lifted off its seat, by axially rotating the valve spindle.

The device is screwed into the engine cylinder wall and is operated by grasping the adjusting nut 13 and pressing it downwardly in the direction of the arrow as in Fig. 1, with the pin 14 entering and passing through the cut-out 15, which lifts the valve body off its seat allowing air or priming fluid, as the case may be, to enter the cylinder interior through duct 16 and bore 7. For the purpose of keeping the valve in opened position for any length of time the nut 13 and with it the spindle 6 is axially rotated when in the lowermost position, shifting the pin 14 under the retaining annulus 9, whereby the valve spindle is relatively locked until, by rotating the spindle again so that the pin 14 can enter and pass back through the cut-out 15, the spring 11 will lift the valve again into the closed position.

What I claim is:—

1. In a valve of the character set forth, in combination, a one-piece body member comprising a polygonal portion, an outwardly threaded neck portion presenting at the lower end a valve seat, a cup portion, and said neck portion and part of said polygonal portion presenting an axially directed central bore in communication with said valve seat, a duct connecting said cup portion and said central bore, a socket extension within said cup portion centrally bored in axial alinement with the first said bore, a spring controlled valve spindle slidably arranged in said alined bores, a valve body at the lower end of said spindle adapted to coact with the said valve seat, and means for locking said valve spindle in the open position.

2. In a valve of the character set forth, in combination with an axially bored valve casing and coöperating valve mechanism including a valve spindle and a compression spring helically surrounding the latter, a socket extension to said casing adapted to guide said valve spindle and to support the lower end of said compression spring, and means for temporarily locking said valve spindle in the lowermost position, comprising a shoulder in said socket extension, a washer having a cut-out open toward the central perforation and adapted to rest on said socket extension shoulder, and a pin laterally extending from said valve spindle and adapted to readily pass through said washer cut-out into the annular chamber presented between said washer and the body of said socket extension.

3. In a valve of the character set forth, in combination, a one-piece body member comprising a main portion, an outwardly threaded neck portion presenting at the free end a valve seat, a cup portion, and said neck portion and part of said main portion presenting an axially directed central bore, in communication with said valve seat, a duct connecting said cup portion and said central bore, a socket portion within said cup portion centrally bored through in axial alinement with the first said bore but the second said bore being of smaller diameter than the first said bore, a spring controlled valve spindle slidably arranged in said alined bores, a valve head at the lower end of said spindle adapted to coact with said valve seat, and means for temporarily locking said valve spindle in the operative position.

In testimony whereof I have affixed my signature.

FRITZ SCHWARZER.